United States Patent
Schmidt et al.

(10) Patent No.: US 8,330,796 B2
(45) Date of Patent: Dec. 11, 2012

(54) ARRANGEMENT AND METHOD FOR THE RECORDING AND DISPLAY OF IMAGES OF A SCENE AND/OR AN OBJECT

(75) Inventors: Alexander Schmidt, Jena (DE); Jens Meichsner, Jena (DE); Ronny Billert, Erfurt (DE)

(73) Assignee: 3D International Europe GmbH, Jena (DE)

( * ) Notice: Subject to any disclaimer, the term of this patent is extended or adjusted under 35 U.S.C. 154(b) by 563 days.

(21) Appl. No.: 11/920,290

(22) PCT Filed: Apr. 27, 2007

(86) PCT No.: PCT/DE2007/000786
§ 371 (c)(1),
(2), (4) Date: Nov. 13, 2007

(87) PCT Pub. No.: WO2008/064617
PCT Pub. Date: Jun. 5, 2008

(65) Prior Publication Data
US 2009/0315982 A1 Dec. 24, 2009

(30) Foreign Application Priority Data
Nov. 22, 2006 (DE) .......................... 10 2006 055 641

(51) Int. Cl.
*H04N 7/00* (2011.01)
*H04N 13/00* (2006.01)
*H04N 13/02* (2006.01)

(52) U.S. Cl. ................ 348/36; 348/42; 348/47
(58) Field of Classification Search ............... 348/36, 348/42, 47
See application file for complete search history.

(56) References Cited

U.S. PATENT DOCUMENTS

| | | | |
|---|---|---|---|
| 6,023,291 A * | 2/2000 | Kamel et al. | 348/147 |
| 6,052,124 A | 4/2000 | Stein et al. | |
| 6,055,012 A | 4/2000 | Haskell et al. | |
| 6,198,505 B1 | 3/2001 | Turner et al. | |
| 6,271,876 B1 | 8/2001 | McIntyre et al. | |

(Continued)

FOREIGN PATENT DOCUMENTS

| | | |
|---|---|---|
| DE | 10 2004 061 998 | 7/2006 |
| EP | 1 418 766 | 5/2004 |
| GB | 2 343 320 | 5/2000 |
| JP | 8-201941 | 8/1996 |
| JP | 8-331605 | 12/1996 |

(Continued)

OTHER PUBLICATIONS

Kyung-tae Kim et al. (Synthesis of a high-resolution 3D-stereoscopic image pair from a high-resolution monoscopic image and a low-resolution depth map, 1998).*

(Continued)

*Primary Examiner* — Minh-Chau Nguyen
(74) *Attorney, Agent, or Firm* — Frommer Lawrence & Haug LLP

(57) ABSTRACT

The invention relates to an arrangement and a method for the recording and display of images of a scene and/or an object. They are suitable especially for the spatially perceived display of the recorded images. The problem of finding a new way of recording, with the least possible effort, images of real scenes or objects and subsequently displaying them three-dimensionally in two or more views by autostereoscopy is solved, according to the invention, in such a way that at least one main camera of a first camera type and at least one satellite camera of a second camera type are provided for the recording of images, with an image conversion device and a 3D image display device being arranged downstream of the cameras. The two camera types differ in at least one parameter; and a total of at least three cameras are provided. The invention also comprises a method for the transmission of 3D information.

28 Claims, 9 Drawing Sheets

U.S. PATENT DOCUMENTS

| | | | |
|---|---|---|---|
| 6,633,676 B1 | 10/2003 | Kleihorst et al. | |
| 2003/0227556 A1* | 12/2003 | Doyle | 348/239 |
| 2003/0231179 A1 | 12/2003 | Suzuki | |
| 2004/0027451 A1* | 2/2004 | Baker | 348/46 |
| 2006/0132610 A1 | 6/2006 | Xin et al. | |

FOREIGN PATENT DOCUMENTS

| | | |
|---|---|---|
| JP | 2000-321050 | 11/2000 |
| JP | 2004-302524 | 10/2004 |
| WO | 2005/124687 | 12/2005 |

OTHER PUBLICATIONS

"Joshi, N. Color Calibration for Arrays of Inexpensive Image Sensors. Technical Report CSTR 2004-02 Mar. 31, 2004 Apr. 4, 2004, Stanford University, 2004".

A. LLie and G. Welch. "Ensuring color consistency across multiple cameras", ICCV 2005.

"Tao, H. and Sawhney, H.: Global matching criterion and color segmentation based stereo, in Proc. Workshop on the Application of Computer Vision (WACV2000), pp. 246-253, Dec. 2000".

"M. Lin and C. Tomasi: Surfaces with occlusions from layered Stereo. Technical report, Stanford University, 2002. In preparation".

"C. Lawrence Zitnick, Sing Bing Kang, Matthew Uyttendaele, Simon Winder, Richard Szeliski: High-quality video view interpolation using a layered representation, International Conference on Computer Graphics and Interactive Techniques, ACM SIGGRAPH 2004, Los Angeles, California, pp. 600-608".

"S. M. Seitz and C. R. Dyer: View Morphing, Proc. SIGGRAPH 96, 1996, 21-30".

* cited by examiner

Koordinate = Coordinate

Koordinate = Coordinate

Fig.10

State of the art

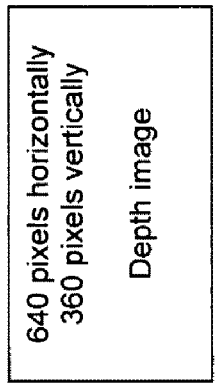
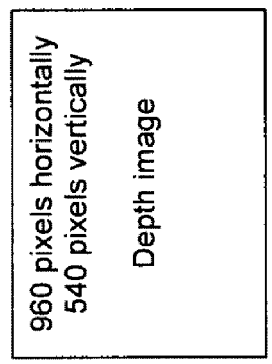
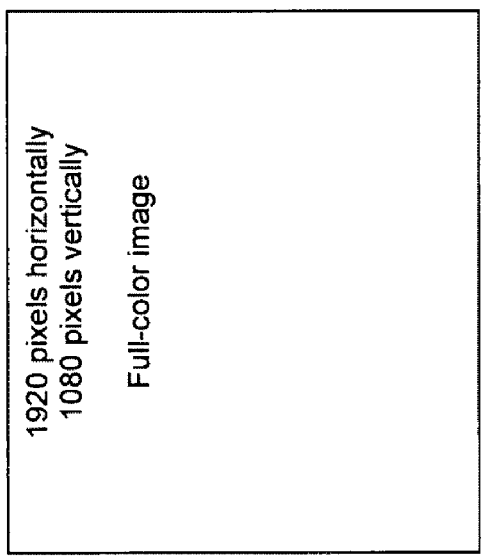
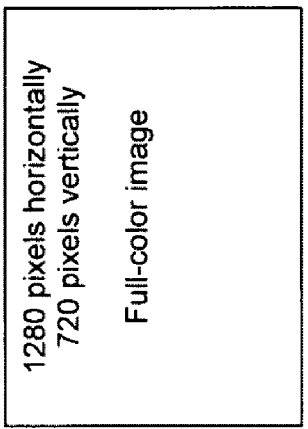
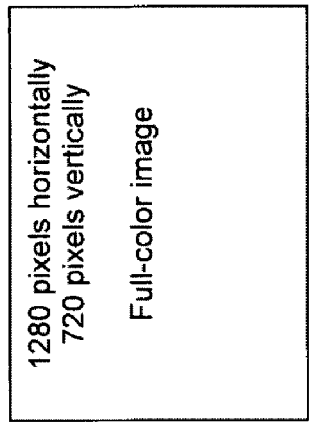
Fig. 11

1

ARRANGEMENT AND METHOD FOR THE RECORDING AND DISPLAY OF IMAGES OF A SCENE AND/OR AN OBJECT

CROSS-REFERENCE TO RELATED APPLICATIONS

This application claims priority of International Application No. PCT/DE2007/000786, filed Apr. 27, 2007 and German Application No. 10 2006 055 641.0, filed Nov. 22, 2006, the complete disclosures of which are hereby incorporated by reference.

BACKGROUND OF THE INVENTION a) Field of the Invention

The invention relates to an arrangement and a method for the recording and display of images (frames) of a scene and/or an object, suitable especially for the display of the recorded images for spatial perception. The invention further relates to a method for the transmission of images for spatial perception.

b) Description of the Related Art

At present there are essentially three basically different methods, and the appertaining arrangements, for recording 3D image information.

First, the classical stereocamera, consisting of two like cameras for a left and a right image. For a highly resolved display, high-resolving camera systems are required, though. For multichannel systems, interpolation of the intermediate views is necessary. Especially in the middle views, artefacts are visible.

Second, the use of a multiview camera system. Its advantage over the stereocamera is the correct image reproduction for multichannel systems. In particular, no interpolations are required. The downside is the great efforts needed to implement an exact alignment of the—e.g., eight—cameras relative to each other. Another drawback is the increased cost involved in using several cameras, which, in addition, entail further problems such as different white levels, tonal values/geometric data, which have to be balanced accordingly. The fact that this method requires an extremely high data rate to be managed must also be regarded as a disadvantage.

Third, the use of a depth camera. This means the use of a color camera jointly with a depth sensor, which registers the—as a rule, cyclopean—depth information of the scene to be recorded. Apart from the fact that a depth sensor is relatively expensive, it is a disadvantage that these sensors often do not work very exactly, and/or that no acceptable compromise between accuracy and speed is achieved. General extrapolation is required, artefacts cannot be excluded especially in the outer views, and generally, occluding artefacts cannot be covered up.

OBJECT AND SUMMARY OF THE INVENTION

The invention is based on the problem of finding a new way of recording real scenes and/or objects with the least possible effort and subsequently to display them three-dimensionally in two or more views for spatial perception. Another problem of the invention is to find a suitable method for transmitting images for spatial perception.

According to the invention, the problem is solved with an arrangement for the recording and display of images of a scene and/or an object in that at least one main camera of a first camera type for the recording of images, at least one satellite camera of a second camera type for the recording of images with the first and second camera types differing by at least one parameter, preferably image resolution, and, downstream of the cameras, an image conversion device for receiving and processing the initial image data and a 3D image display device that displays the image data for spatial perception without special viewing aids, the 3D image display device displaying at least three views. However, the said 3D image display device may also display 4, 5, 6, 7, 8, 9 or even more views simultaneously or at an average time. Especially in image display devices of the last-named, so called "multiview" 3D type, the special advantages of the invention take effect, viz. that it is possible, with relatively few (e.g. three) cameras, to provide more views than the number of cameras.

In all, three cameras, i.e. at least one main and two satellite cameras or at least two main and one satellite camera, are provided. Main and satellite cameras generally, but not imperatively, differ by their quality. Mostly, the main camera is a high-quality camera, whereas the satellite cameras may be of lesser quality (e.g., industrial cameras) and thus mostly, but not imperatively, have a lower resolution, among other parameters. Essentially, the advantage of the invention is that, rather than the classical stereocamera system, here consisting essentially of two identical high-resolution cameras, a three-camera system is used, preferably consisting of a central high-quality camera and two additional cameras of lower resolution, arranged to the left and right, respectively, of the main camera. In other words, the main camera is preferably arranged between the satellite cameras. The distances between the cameras and their alignment (either in parallel or pointed at a common focus) are variable within customary limits. The use of further satellite cameras may be of advantage, as this enables a further reduction of misinterpretations especially during the subsequent processing of the image data. All cameras may be arranged in parallel or pointed at a common focus. It is also possible that not all of them are pointed at a common focus (convergence angle). The optical axes of the cameras may lie in one plane or in different planes, with the center points of the objectives preferably arranged in line or on a (preferably isosceles or equilateral) triangle. For special cases of application, the center points of the cameras' objectives may also be spaced at unequal distances relative to each other (with the objective center points forming a scalene triangle). It is further possible that all (at least three) cameras (i.e. all existing main and satellite cameras) differ by at least one parameter, e.g. by their resolution. The cameras should be synchronized with regard to zoom, f-stop, focus etc. as well as with regard to the individual frames (i.e. true-to-frame synchronization in recording). The cameras may be fixed at permanent locations or movable relative to each other; the setting of both the base distance between the cameras and the convergence angles may be automatic.

It may be of advantage to provide adapter systems that facilitate fixing, especially the satellite cameras to the main camera. In this way, ordinary cameras can be subsequently converted into a 3D camera. It is also feasible, though, to convert an existing stereocamera system into a 3D camera conforming to the invention by retrofitting an added main camera.

Furthermore, the beam path—preferably in front of the objectives of the various cameras—can be provided with additional optical elements, e.g. semitransparent mirrors. This makes it possible, e.g., to arrange each of two satellite cameras rotated 90 degrees relative to the main camera, so that the camera bodies of all three cameras are arranged in such a way that their objective center points are closer together horizontally than they would be if all three cameras were arranged immediately side by side, in which case the dimension of the camera bodies would necessitate a certain, greater spacing of the objective center points. In the constellation with the two satellite cameras rotated 90 degrees, a semitransparent mirror arranged at an angle of about 45 degrees relative to the principal rays emerging from the objectives of the satellite cameras would follow in reflection position, whereas the same mirror arranged at an angle of also 45 degrees relative to the principal ray emerging from the objective of the main camera follows in transmission position.

Preferably, the objective center points of the main camera and of at least two satellite cameras form an isosceles triangle.

For special embodiments it may also be useful to use black-and-white cameras as satellite cameras, and subsequently automatically assign a tonal value preferably to the images produced by them.

The problem is also solved by a method for the recording and display of images of a scene and/or an object, comprising the following steps:

Creation of at least an n-tuple of images, with n>2, with at least two images having different resolutions, Transfer of the image data to an image conversion device, in which subsequently a rectification, a color adjustment, a depth or disparity recognition and subsequent generation of further views from the n-tuple of images and the depth or disparity recognition values are carried out, so that at least one view is generated that is not exactly equal to any of the images of the n-tuple created, Subsequent creation of a combination of at least three different views or images in accordance with the parameter assignment of the 3D display of a 3D image display device for spatial presentation without special viewing aids, and finally Presentation of the combined 3D image on the 3D display.

The depth recognition and subsequent generation of further views from the n-tuple of images and the depth can be carried out, for example, by creating a stack structure and projecting the stack structure onto a desired view.

The creation of a stack structure may be replaced by other applicable depth or disparity recognition algorithms, with the depth or disparity values recognized being used for the creation of desired views.

A stack structure may, in general, correspond to a layer structure of graphical elements in different (virtual) planes.

If a 3D camera system consisting of cameras of different types with different image resolutions is used, it is necessary first to carry out a size adaptation after transfer of the image data to the image conversion device. The result of this are images that all have the same resolution. This may correspond to the highest resolution of the cameras, but preferably it is equal to that of the lowest-resolution camera(s). Subsequently, the camera images are rectified, i.e. their geometric distortions are corrected (compensation of lens distortions, misalignment of cameras, zoom differences, etc., if any). The size adaptation may also be performed within the rectifying process. Immediately after, a color adjustment is carried out, e.g. as taught by the publications "Joshi, N. Color Calibration for Arrays of Inexpensive Image Sensors. Technical Report CSTR 2004-02 Mar. 31, 2004 Apr. 4, 2004, Stanford University, 2004" and A. LLie and G. Welch. "Ensuring color consistency across multiple cameras", ICCV 2005. In particular, the tonal/brightness values of the camera images are matched, so that they are at an equal or at least comparable level. For the image data thus provided, the stack structure for depth recognition is established. In this process, the input images, stacked on top of each other in the first step, are compared with each other line by line. The linewise comparison can possibly be made in an oblique direction rather; this will be favorable if the cameras are not arranged in a horizontal plane. If pixels lying on top of each other have the same tonal value, this will be saved; if they have different tonal values, none of these will be saved. Thereafter, the lines are displaced relative to each other by defined steps (e.g., by ¼ or ½ pixel) in opposite directions; after every step the result of the comparison is saved again. At the end of this process, the three-dimensional stack structure with the coordinates X, Y and Z is obtained, with X and Y corresponding to the pixel coordinates of the input image, whereas Z represents the extent of relative displacement between the views. Thus, if two or three cameras are used, always two or three lines, respectively, are compared and displaced relative to each other. It is also possible to use more than two, e.g., three cameras and still combine always two lines only, in which case the comparisons have to be matched once more. If three or more lines are compared, there are far fewer ambiguities than with the comparison of the two lines of two input images only. In the subsequent optimization of the stack structure, the task essentially consists in deleting the least probable combinations in case of ambiguous representations of image elements in the stack. In addition, this contributes to data reduction. Further reduction is achieved if a height profile curve is derived from the remaining elements to obtain an unambiguous imaging of the tonal values in a discrete depth plane (Z coordinate). What normally follows now is the projection of the stack structure onto the desired views. At least two views should be created, one of which might still be equal to one of the input images. However, this is done, as a rule, with the particular 3D image display device in mind that is used thereafter. The subsequent combination of the different views provided corresponds to the parameter assignment of the 3D display.

Alternatively it is possible, in the method described above for the recording and display of images of a scene and/or an object, to create the images by means of a computer. In this case, preferably a depth map is created for each image, so that the rectification, color adjustment and depth or disparity recognition steps can be dropped. Preferably, at least two of the three depth maps have different resolutions. In a preferred embodiment, n=3 images may be provided, one of which has the (full-color) resolution of 1920×1080 pixels and the other two have the (full-color) resolution of 1280×720 pixels, whereas the appertaining depth maps have 960×540 and 640×360 pixels, respectively. The image having the higher resolution corresponds, in spatial terms, to a perspective view lying between the perspective views of the other two images.

The 3D image display device employed can preferably display 4, 5, 6, 7, 8, 9 or even more views simultaneously or at an average time. It is particularly with such devices, known as "multi view" 3D image display devices, that the special advantages of the invention take effect, namely, that with relatively few (e.g. three) original images, more views can be provided for spatial display than the number of original images. The combination, mentioned further above, of at least three different views or images in accordance with the parameter assignment of the 3D display of a 3D image display device for spatial presentation without special viewing aids may contain a combination of views not only from different points in space but in time also.

Another important advantage of the invention is the fact that, after the optimization of the stack structure, the depth is determined per original image. The resulting data have an extremely efficient data transfer format, viz. as n images (e.g. original images, or views) plus n depth images (preferably with n=3), so that a data rate is achieved that is markedly lower than that required if all views were transferred. As a consequence, a unit for the reconstruction of the stack structure and the unit for the projection of the stack structure onto the desired view have to be integrated into the 3D image display device.

For the steps mentioned above, it is possible to use disparity instead of depth. The term "projection" here may, in principle, also mean a pure displacement.

Of course, other depth or disparity recognition methods than the one described before can be used to detect depth or disparities from the n-tuple of images (with n>2), and/or to generate further views from this n-tuple of images. Such alternative methods or partial methods are described, for example, in the publications "Tao, H. and Sawhney, H.: Global matching criterion and color segmentation based stereo, in Proc. Workshop on the Application of Computer Vision (WACV2000), pp. 246-253, December 2000", "M. Lin and C. Tomasi: Surfaces with occlusions from layered Stereo. Technical report, Stanford University, 2002. In preparation", "C. Lawrence Zitnick, Sing Bing Kang, Matthew Uyttendaele, Simon Winder, Richard Szeliski: High-quality video view interpolation using a layered representation, International Conference on Computer Graphics and Interactive Techniques, ACM SIGGRAPH 2004, Los Angeles, Calif., pp: 600-608", "S. M. Seitz and C. R. Dyer: View Morphing, Proc. SIGGRAPH 96, 1996, 21-30".

In an advantageous embodiment, the invention comprises a method for the transmission of 3D information for the purpose of later display for spatial perception without special viewing aids, on the basis of at least three different views, a method in which, starting from at least one n-tuple of images (with n>2) characterizing different angles of view of an object or a scene, the depth is determined or rendered for each image, and thereafter the n-tuple of images together with the respective depth information (in depth maps) is transferred in a transmission channel, with at least two (or all) images of the n-tuple having different resolutions. The transmission channel may be, e.g., a digital TV signal, the Internet or a DVD (HD, SD, BlueRay etc.). As a compression standard, MPEG-4 can be used to advantage.

It is also of advantage if at least two of the three depth maps have different resolutions. For example, in a preferred embodiment, n=3 may be provided, one of them having the (full-color) resolution of 1920×1080 pixels, and two having the (full-color) resolution of 1280×720 pixels, whereas the pertaining depth maps have 960×540 or 640×360 pixels, respectively. The image having the higher resolution corresponds, in spatial terms, to a perspective view lying between the perspective views of the other two images.

The 3D image display device employed can preferably display 4, 5, 6, 7, 8, 9 or even more views simultaneously or at an average time. Especially those mentioned last, known as "multi-view" 3D image display devices, the special advantages of the invention take effect, viz. that with relatively few (e.g. three) original images, more views can be provided than the number of original images. The reconstruction from the n-tuple of images transmitted together with the respective depth information (with at least two images of the n-tuple having different resolutions) in different views is performed, e.g., in the following way: In a three-dimensional coordinate system, the color information of each image—observed from a suitable direction—are arranged in the depth positions marked by the respective depth information belonging to the image. This creates a colored three-dimensional volume with volume pixels (voxels), which can be imaged from different perspectives or directions by a virtual camera or by parallel projections. In this way, more than three views can be advantageously regenerated from the information transmitted. Other reconstruction algorithms for the views or images are possible as well.

Regardless of this, the information transmitted is reconstructible in a highly universal way, e.g. as tomographic slice images or voxels. Such image formats are required for special 3D presentation methods, such as volume 3D display.

Moreover, in all transmission versions proposed by this invention it is possible to transmit meta-information, e.g. in a so-called alpha channel in addition. This may be information supplementing the images, such as geometric conditions of the n>2 images (e.g., relative angles, camera parameters), or transparency or contour information.

Below, the invention is described in greater detail by example embodiments.

BRIEF DESCRIPTION OF THE DRAWINGS

The drawings show:

FIG. 10: a schematic illustration of an image combination of four images, suitable for spatial display without special viewing aids (state of the art); and FIG. 11: a schematic illustration of the transmission method according to the invention.

DESCRIPTION OF THE PREFERRED EMBODIMENTS

Figure 1:
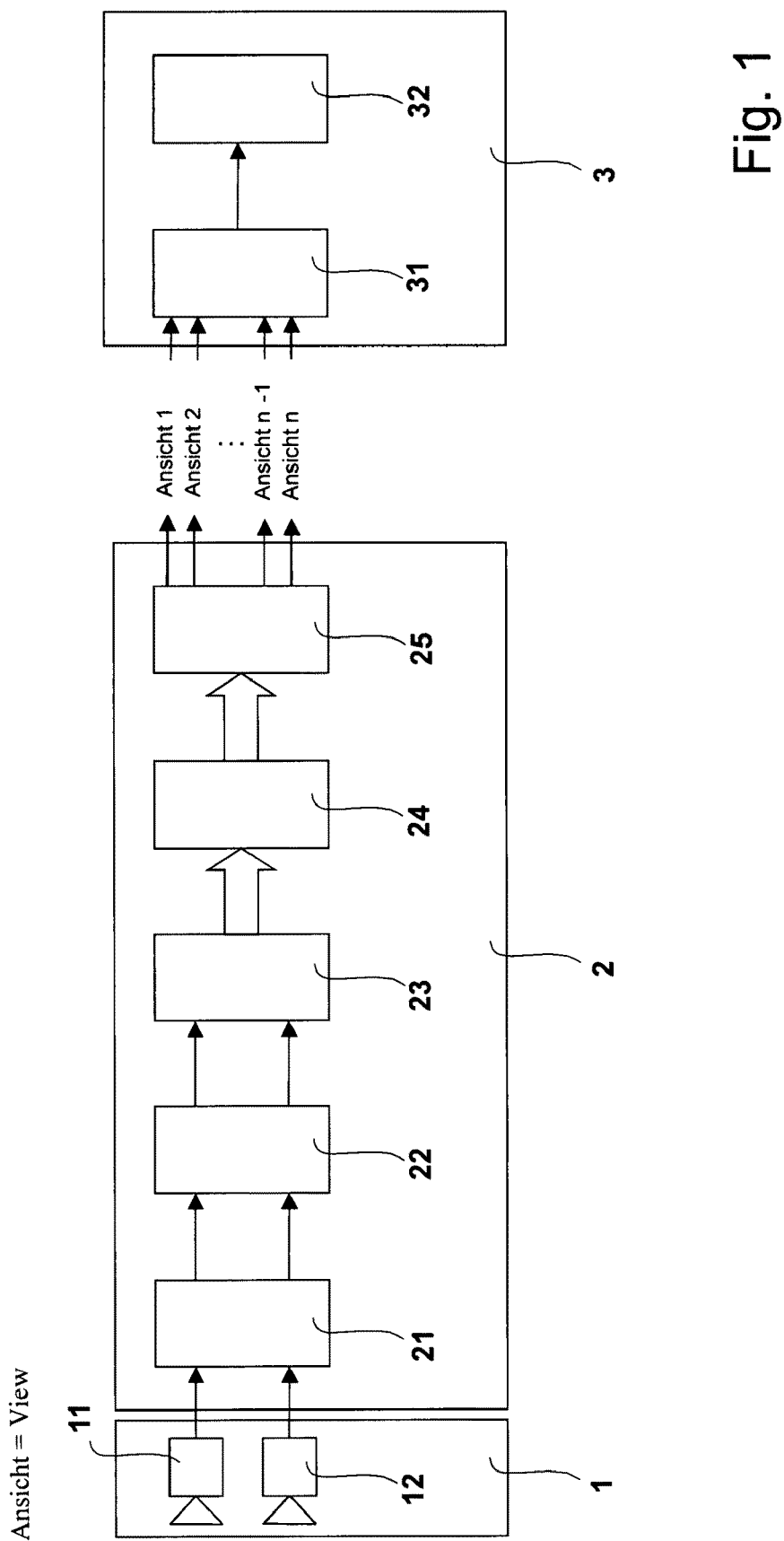
FIG. 1: a sketch illustrating the principle of the arrangement according to the invention.
Figure 2:
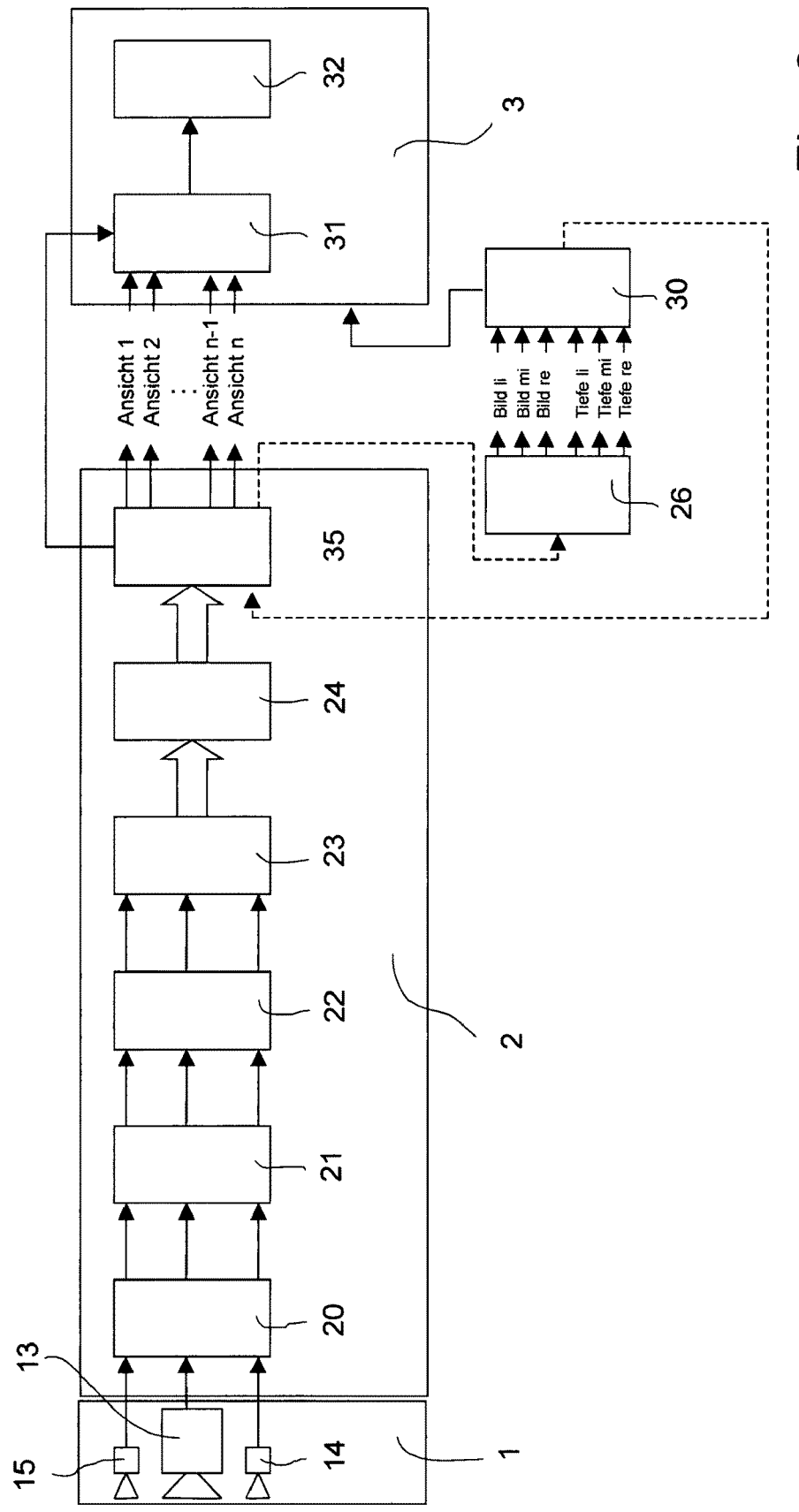
FIG. 2: a version with a main camera and two satellite cameras.

An arrangement according to the invention essentially consists of a stereocamera system 1, an image conversion device 2 and a 3D image display device 3. As shown in FIG. 1, the stereocamera system 1 contains a right camera 11 and a left camera 12, the image conversion device 2 contains a rectification unit 21, a color adjustment nit 22, a unit for establishing the stack structure 23, a unit for the optimization of the stack structure 24, and a unit 25 for the projection of the stack structure onto the desired view, and the 3D image display device 3 contains an image combination unit 31 and a 3D display 32, with the 3D display 32 displaying at least three views of a scene/of an object for spatial presentation. The 3D display 32 can also work on the basis of, say, 4, 5, 6, 7, 8, 9 or even more views. As an example, a 3D display 32 of model "Spatial View 19 inch" is eligible. FIG. 2 shows another arrangement according to the invention. Here, the 3D camera system 1 contains a main camera 13, a first satellite camera 14, and a second satellite camera 15. The image conversion device 2 contains a size adaptation unit 20, a rectification unit 21, a color adjustment unit 22, a unit for establishing the stack structure 23, a unit for the optimization of the stack structure 24, and a unit for determining the depth 26, and the 3D image display device 3 contains, as shown in FIG. 2, a unit for the reconstruction of the stack structure 30, a unit for the projection of the stack structure onto the desired view 35, an image combination unit 31, and a 3D display 32.

Figure 3:
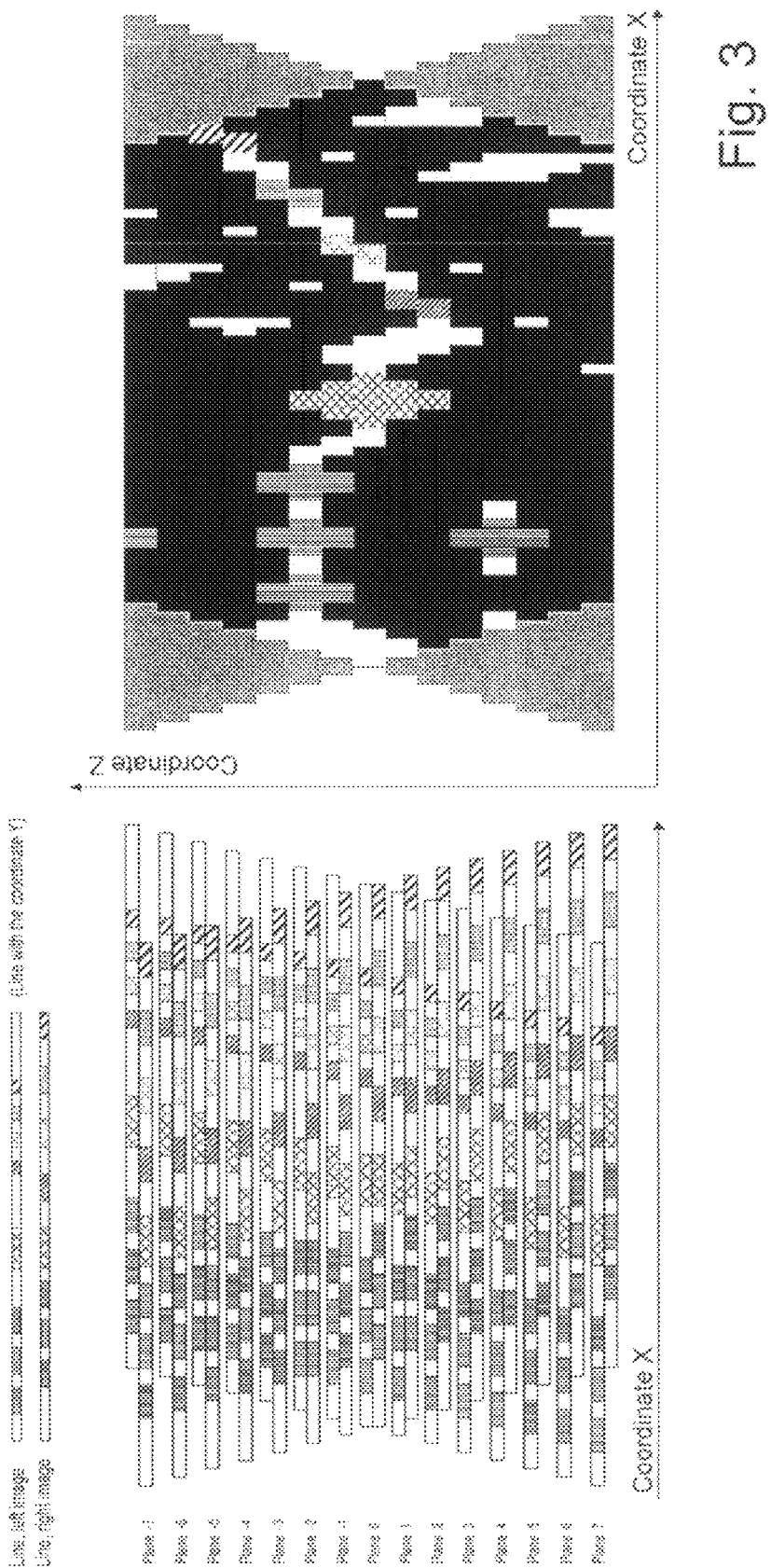
FIG. 3: a schematic illustration of the step-by-step displacement of two lines against one another, and generation of the Z coordinate.
Figure 4:
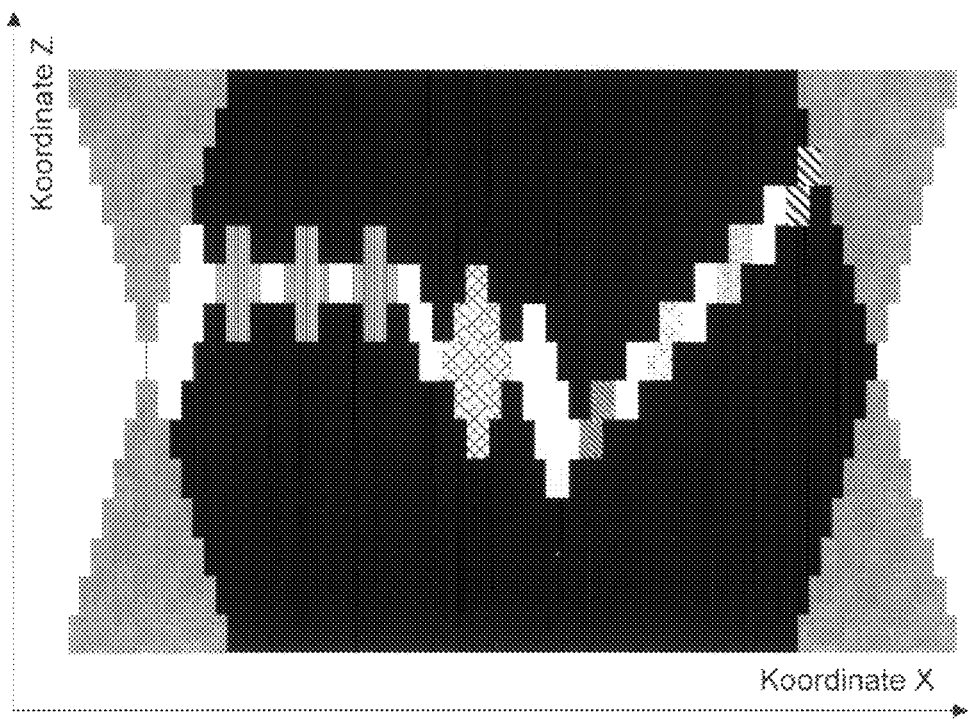
FIG. 4: a scheme of optimization by elimination of ambiguities compared to FIG. 3.
Figure 5:
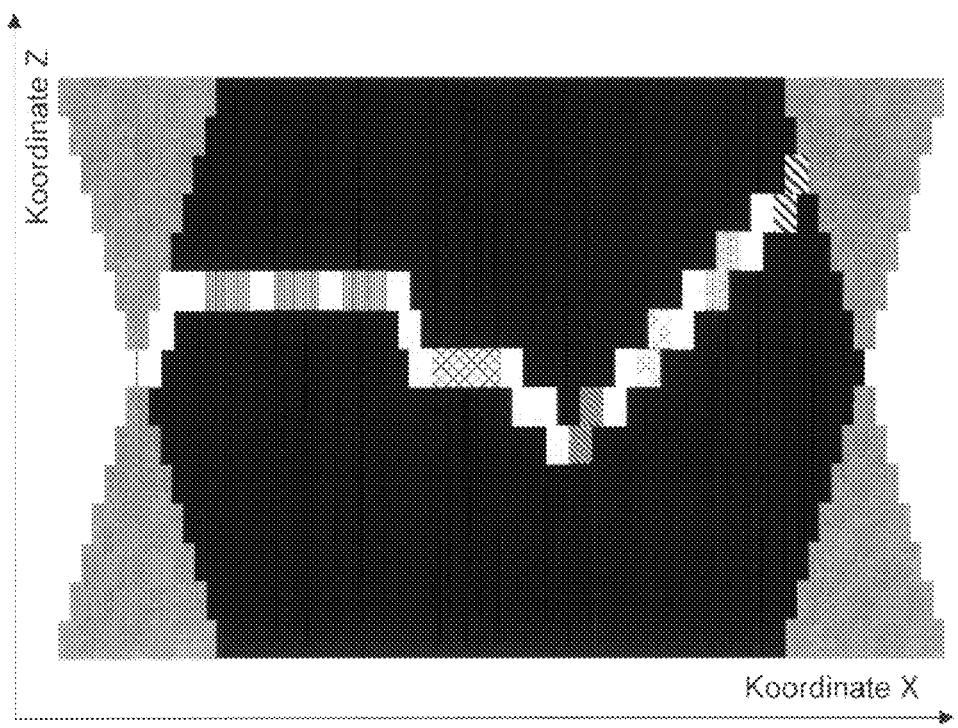
FIG. 5: a scheme of optimization by reduction of the elements to an unambiguous height profile curve, compared to FIG. 4.
Figure 6:
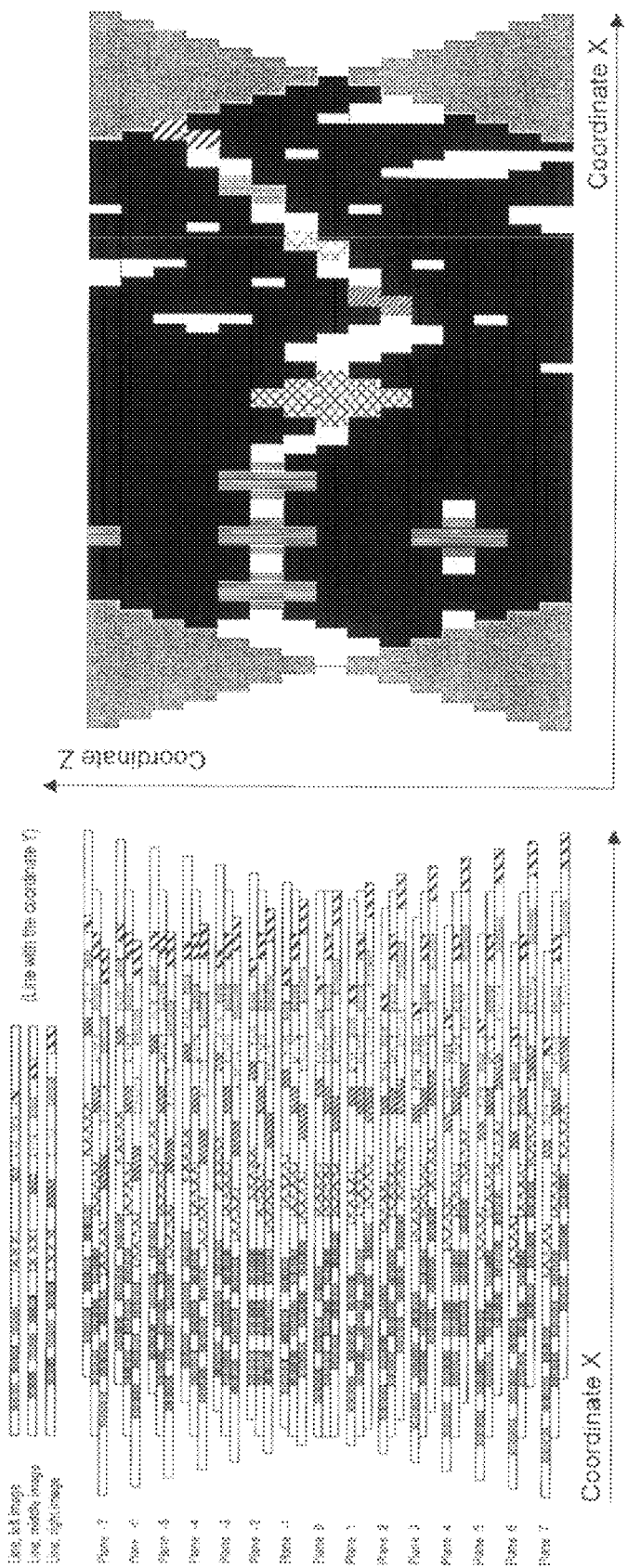
FIG. 6: a schematic illustration of the step-by-step displacement of three lines against one another, and generation of the Z coordinate.
Figure 7:
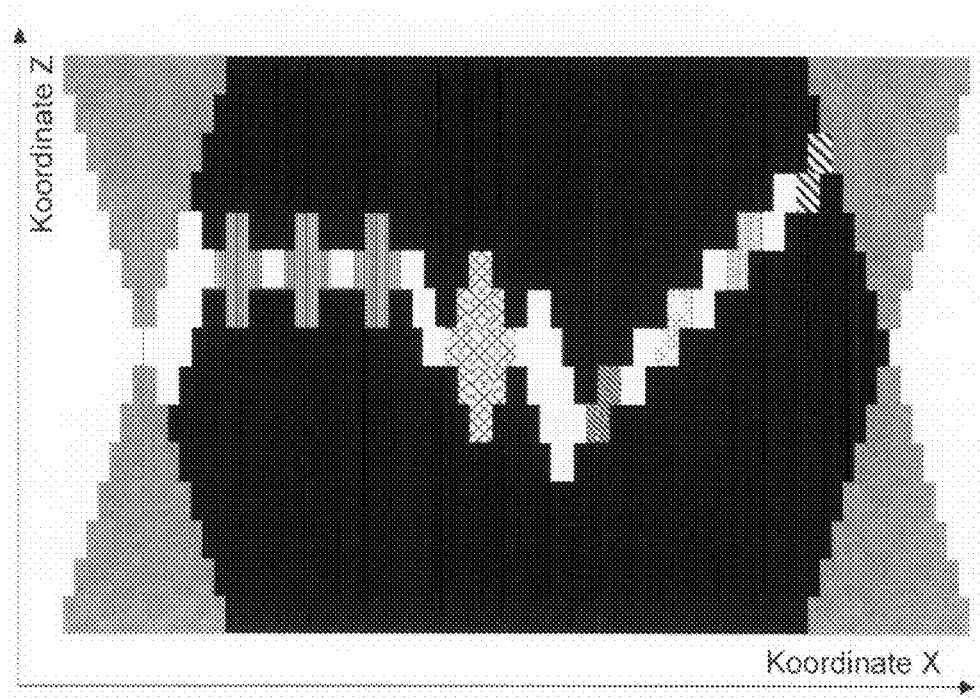
FIG. 7: a scheme of optimization by elimination of ambiguities compared to FIG. 6.
Figure 8:
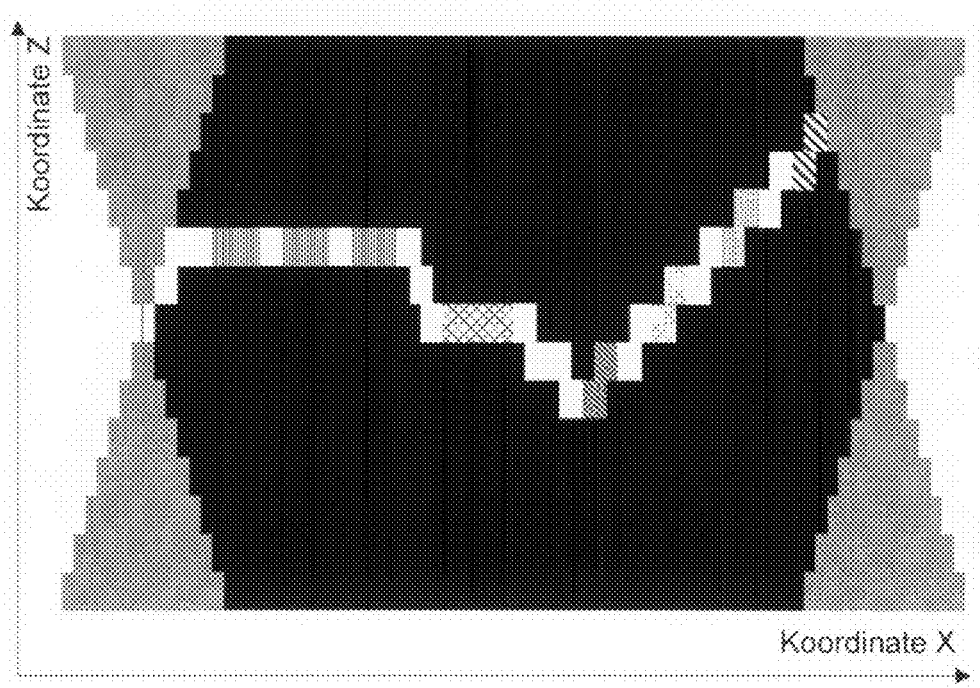
FIG. 8: a scheme of optimization by reduction of the elements to an unambiguous height profile curve, compared to FIG. 7.
Figure 9:
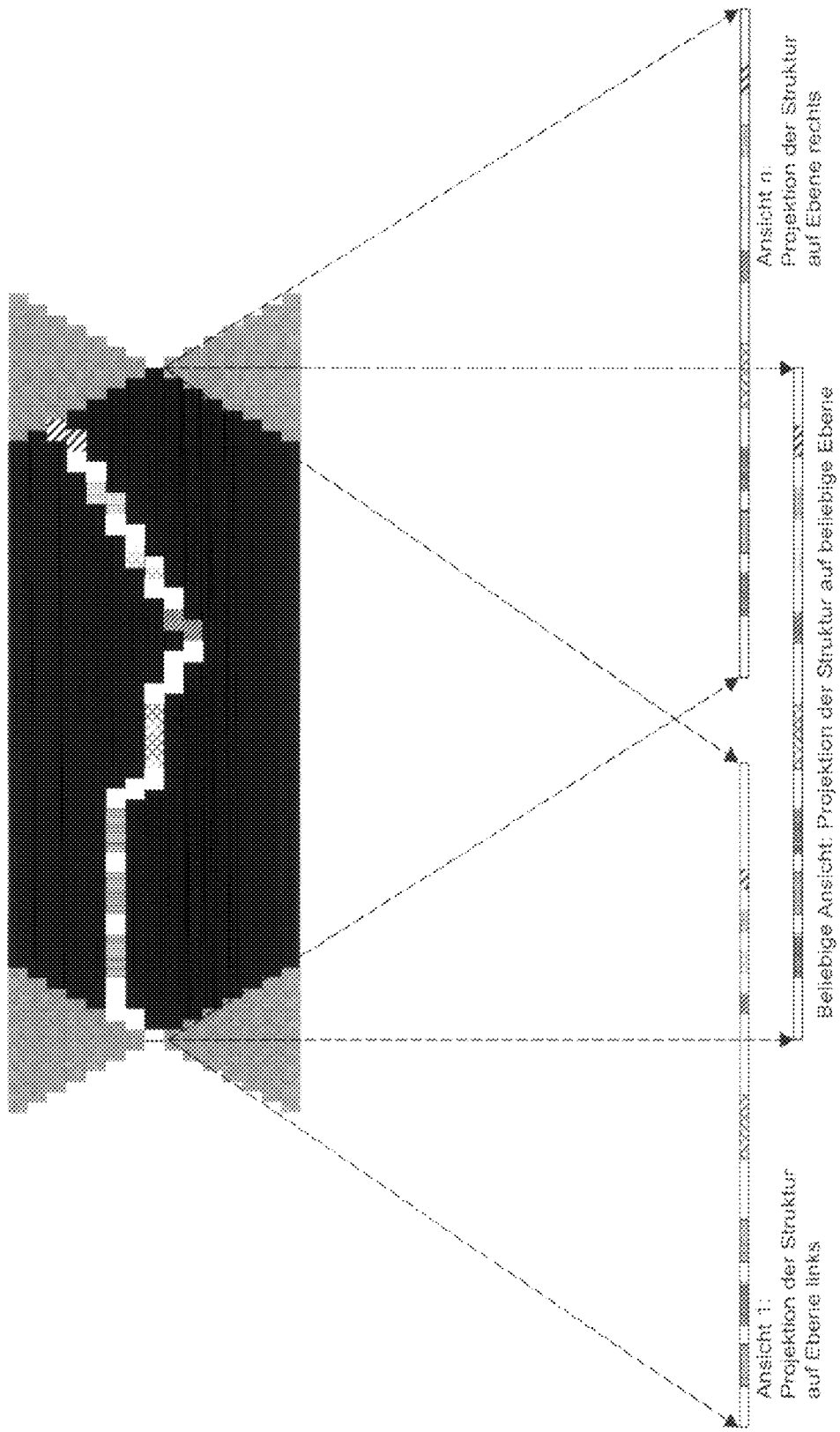
FIG. 9: a schematic illustration of a projection of a view from the scheme of optimization.

According to the embodiment shown in FIG. 1, the stereocamera system 1 contains two identical cameras (11, 12) having equal resolving powers, so that the image data recorded can be directly conducted to the rectification unit 21. According to the embodiment shown in FIG. 2, the 3D camera system 1 consists of a main camera 13 and two satellite cameras 14, 15, the main camera 13 being a high-quality with a high resolving power, whereas the two satellite cameras 14, 15 have a lower resolving power. As usual, the camera positions relative to each other are variable in spacing and alignment within the known limits, so that stereoscopic images can be taken. The image data recorded by the cameras (13, 14, 15) are conducted to the size adaptation unit 20 as shown in FIG. 2. Here, the image resolution of the satellite cameras 14, 15 is matched to that of the main camera 13, so that all images have the same resolution. In the rectification unit 21 arranged downstream, the camera images are rectified, i.e. a compensation of lens distortions, camera rotations, zoom differences, etc., is made. The rectification unit 21 is followed by the color adjustment unit 22. Here, the color/brightness values of the recorded images are balanced to a common level. The image data thus corrected are now fed to the unit for establishing the stack structure 23. The input images are compared with each other line by line. The comparison illustrated in FIG. 3 is based on the embodiment of the stereocamera system 1 as shown in FIG. 1, as here the comparison is made of only two lines each. In the first step, at first two lines are placed one on top of the other with the same Y coordinate, which, according to FIG. 3, corresponds to plane 0. The comparison is made pixel by pixel, and, as shown in FIG. 3, the result of the comparison is saved as a Z coordinate in accordance with the existing comparison plane, a process in which pixels lying on top of each other retain their tonal value if it is identical; if it is not, no tonal value is saved. In the second step, the lines are displaced by increments of ½ pixel each as shown in FIG. 3, with the pixel being assigned to plane 1, or a next comparison is made in plane 1, the result of which is saved in plane 1 (Z coordinate). As can be seen from FIG. 3, the comparisons are generally made up to plane 7 and then with plane −1 up to plane −7, each being saved as a Z coordinate in the respective plane. The number of planes corresponds to the maximum depth information occurring, and may vary depending on the image content. The three-dimensional structure thus established with the XYZ coordinates means that, for each pixel, the degree of relative displacement between the views is saved via the appertaining Z coordinate. In FIG. 6, the same comparison is made on the basis of the embodiment shown in FIG. 2, save that three lines are compared here. A simple comparison between FIG. 6 and FIG. 3 shows that the comparison of three lines involves substantially fewer misinterpretations. Thus, it is of advantage to do the comparison with more than two lines. The stack structure established, which is distinguished also by the fact that now the input images are no longer present individually, is fed to the subsequent unit for optimization of the stack structure 24. Here, ambiguous depictions if image elements are identified with the aim to delete such errors due to improbable combinations, so that a corrected set of data is generated in accordance with FIG. 4 or FIG. 7. In the next step, a height profile curve that is as shallow or smooth as possible is established from the remaining elements in order to achieve an unambiguous imaging of the tonal values in a discrete depth plane (Z coordinate). The results are shown in FIG. 5 and FIG. 8, respectively. The result according to FIG. 5 is now fed to the unit 25 for the projection of the stack structure onto the desired view as shown in FIG. 1. Here, the stack structure is projected onto a defined plane in the space. The desired view is generated via the angles of the plane, as can be seen in FIG. 9. As a rule, at least one view is generated that is not exactly equal to any of the images recorded by the camera system 1. All views generated are present at the output port of the image conversion device 2 and can thus be transferred to the subsequent 3D image display device 3 for stereoscopic presentation; by means of the image combination unit 31 incorporated, at first the different views are combined in accordance with the given parameter assignment of the 3D display 32.

FIG. 2 illustrates another way for transmitting the processed data to the 3D image display device 3. Here, the unit 24 for the optimization of the stack structure is followed by the unit 26 for determining the depth. Determining the depth of the images creates a particularly efficient data transfer format. This is because only three images and three depth images are transferred, preferably in the MPEG-4 format. According to FIG. 2, the 3D image display device 3 is provided, on the input side, with a unit 30 for reconstructing the stack structure, a subsequent image combination unit 31 and a 3D display 32. In the unit 30 for reconstructing the stack structure, the images and depths received can be very efficiently reconverted into the stack structure by inverse projection, so that the stack structure can be made available to the subsequent unit 35 for projecting the stack structure onto the desired view. The further procedure is then identical to the version illustrated in FIG. 1, save for the advantage that not all the views need to be transferred.

Figure 10:
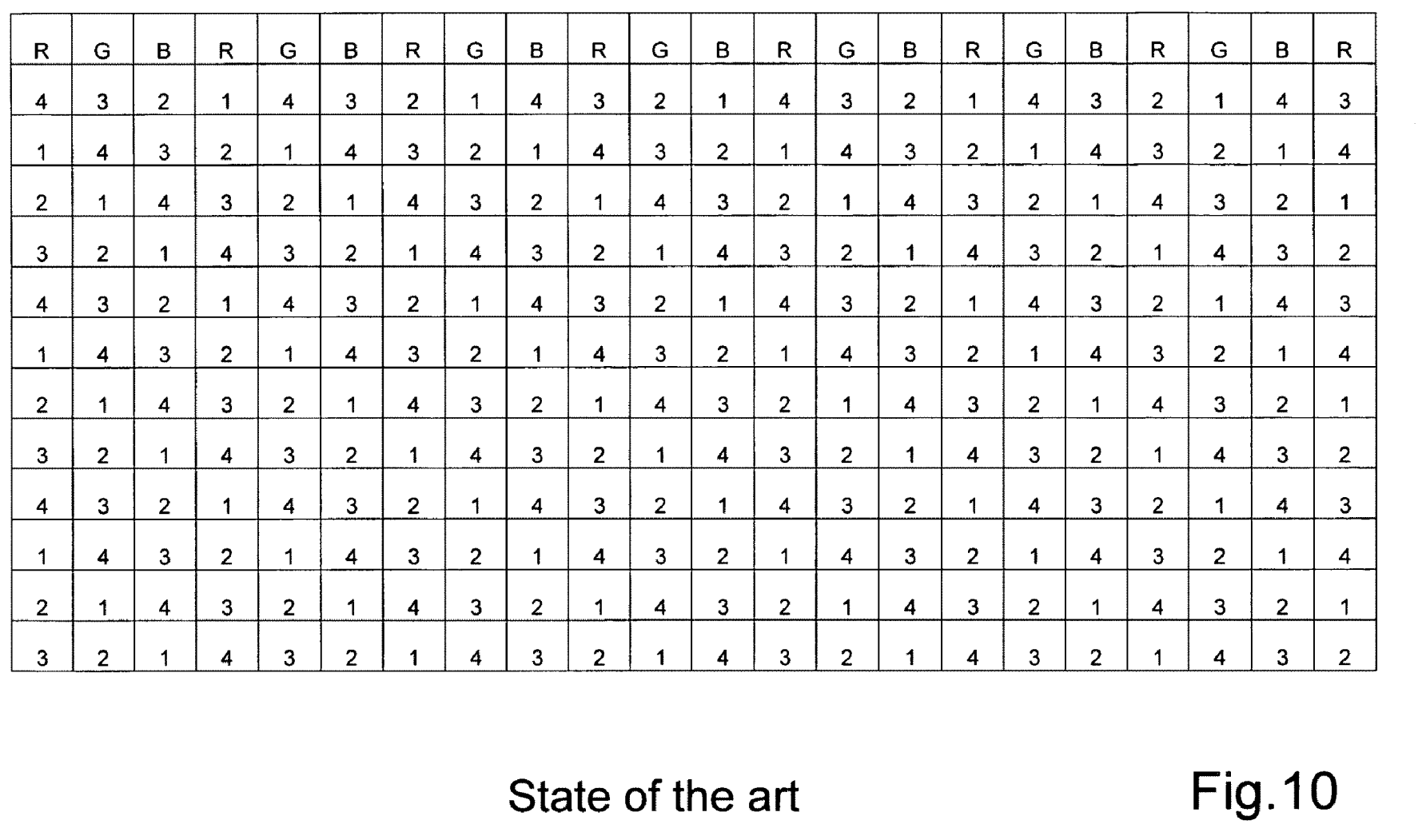

For better understanding, FIG. 10 shows a schematic illustration of a state-of-the-art method (JP 08-331605) to create an image combination of four images, suitable for spatial presentation on a 3D display without special viewing aids, for example on the basis of a suitable lenticular or barrier technology. For that purpose, the four images or views have been combined in the image combination unit 31 in accordance with the image combination structure suitable for the 3D display 32.

FIG. 11, finally, is a schematic illustration of the transmission method according to the invention. In an MPEG-4 data stream, a total of 3 color images and 3 depth images (or streams of moving images accordingly) are transmitted. To particular advantage, one of the color image streams has a resolution of 1920×1080 pixels, whereas the other two have a resolution of 1280×720 pixels. Each of the appertaining depth images (or depth image streams) is transmitted with half the horizontal and half the vertical resolution, i.e. 960×540 pixels and 640×360 pixels, respectively. In the simplest case, the depth images consist of gray-scale images, e.g. with 256 or 1024 possible gray levels per pixel, with each gray level representing one depth value.

In another embodiment, the highest-resolution color image would have, for example, 4096×4096 pixels, and the other color images would have 2048×2048 or 1024×1024 pixels. The appertaining depth images (or depth image streams) are transmitted with half the horizontal and half the vertical resolution. This version would be of advantage if the same data record is to be used for stereoscopic presentations of particularly high resolution (e.g. in the 3D movie theater with right and left images) as well as for less well-resolved 3D presentation on 3D displays, but then with at least three views presented.

LIST OF REFERENCE NUMBERS

1 Camera system
11 Right camera
12 Left camera
13 Main camera
14 First satellite camera
15 Second satellite camera
2 Image conversion device
20 Size adaptation unit
21 Rectification unit
22 Color adjustment unit
23 Unit for establishing the stack structure
24 Unit for optimizing the stack structure
25 Unit for projecting the stack structure onto the desired view
26 Unit for determining the depth
3 3D image display device
30 Unit for reconstructing the stack structure
31 Image combination unit
32 3D display
35 Unit for projecting the stack structure onto the desired view.

What is claimed is:

1. A method for the recording and display of images of a scene and/or an object, comprising the following steps:
generating at least one n-tuple of images, with n>2, with at least two images having different resolutions;
transferring the image data to an image conversion device, in which then a rectification, a color adjustment, a depth or disparity recognition, and subsequent generation of further views from the n-tuple of images and from the depth or disparity recognition data are carried out, with at least one view being generated that is not exactly equal to any of the n-tuple of images generated;
subsequently generating a combination of at least three different views or images in accordance with the parameter assignment of the 3D display of a 3D image display device, for spatial presentation without special viewing aids; and
finally presenting the combined 3D image on the 3D display;
wherein, if one main camera and two or four satellite cameras having a resolution differing from the resolution of the main camera are used, a size adaptation is carried out prior to the rectification, so that after the size adaptation all images have the same resolution.

2. A method as claimed in claim 1;
wherein, for depth recognition, a stack structure is established by means of a line-by-line comparison of the pre-processed initial image data of an n-tuple, in such a way that first those lines of the images of the various cameras which have the same Y coordinate are placed in register on top of each other and a first comparison is made, the result of the comparison being saved in one line in such a way that equal tonal values in register are saved, whereas different tonal values are deleted, which is followed by a displacement of the lines in opposite directions by specified increments of preferably ¼ to 2 pixels, the results after each increment being saved in further lines analogously to the first comparison; so that, as a result after the comparisons made for each pixel, the Z coordinate provides the information about the degree of displacement of the views relative to each other.

3. The method as claimed in claim 2;
wherein, after the establishment of the stack structure, an optimization is made in such a way that ambiguities are eliminated, and/or a reduction of the elements to an unambiguous height profile curve is carried out.

4. The method as claimed in claim 3;
wherein, after transfer of the original images and the respective depths appertaining to them, a reconstruction is carried out by inverse projection of the views into the stack space by means of depth images, so that die stack structure is reconstructed.

5. The method as claimed in claim 1;
wherein the images are generated by means of a computer.

6. The method as claimed in claim 5;
wherein a depth map is generated for each image, so that the rectification, color adjustment and depth or disparity recognition steps can be dropped.

7. The method as claimed in claim 6;
wherein at least two depth maps differing in resolution are generated.

8. The method as claimed in claim 1;
wherein, after the projection of the stack structure onto the desired view, the depth for each original image is determined.

9. The method as claimed in claim 8;
wherein the original images with the respective depths appertaining to them are transferred to the 3D image display device, after which first a reconstruction, wherein an optimization is made in such a way that ambiguities are eliminated, and/or a reduction of the elements in an unambiguous height profile, is carried out.

10. The method as claimed in claim 1;
wherein the images generated are transferred to the image conversion device.

11. The method as claimed in claim 1;
wherein all views generated by the image conversion device are transferred to the 3D image display device.

12. The method as claimed in claim 1;
wherein the images are generated by means of a 3D camera system.

13. A method for the transmission of 3D information for the purpose of later display for spatial perception without special viewing aids, on the basis of at least three different views, the method comprising:
determining or rendering a depth for each of at least one n-tuple of images, with n>2, where the images characterize different angles of view of an object or a scene; and
thereafter transmitting in a transmission channel the n-tuple of images, together with the respective depth information (in depth maps), with at least two images of the n-tuple having different resolutions.

14. The method as claimed in claim 13;
wherein the n-tuple of images is a triple of images (n=3).

15. The method as claimed in claim 14;
wherein at least two of the three depth maps have different resolutions.

16. The method as claimed in claim 15;
wherein the image data and the depth information are generated in the MPEG-4 format.

17. The method as claimed in claim 14;
wherein the image data and the depth information are generated in the MPEG-4 format.

18. The method as claimed in claim 13;
wherein the image data and the depth information are generated in the MPEG-4 format.

19. An arrangement for the recording and display of images or frames of a scene and/or an object, comprising:
- at least one main camera of a first camera type for the recording of images;
- at least one satellite camera of a second camera type for the recording of images, with the camera types differing in at least one parameter, and with a total of at least three cameras, one main camera and two satellite cameras or two main cameras and one satellite camera, being provided;
- an image conversion device, arranged downstream of the cameras, that receives and processes the initial image data and that generates at least three views of each image of the scene recorded; and
- a 3D image display device, connected to the image conversion device, that displays the provided image data for spatial perception without special viewing aids, with the 3D image display device displaying at least three views.

20. The arrangement as claimed in claim 19;
wherein exactly one main camera and two satellite cameras are provided.

21. The arrangement as claimed in claim 20;
wherein the main camera is arranged between the satellite cameras.

22. The arrangement as claimed in claim 19;
wherein the two camera types differ at least in the resolution of the images to be recorded.

23. The arrangement as claimed in claim 19;
wherein the two camera types differ at least in the built-in imaging chip.

24. The arrangement as claimed in claim 19;
wherein exactly one main camera and four satellite cameras are provided.

25. The arrangement as claimed in claim 19;
wherein one of the at least three views generated is still equal to the input image.

26. The arrangement as claimed in claim 19;
wherein the main camera and all satellite cameras record in frame-accurate synchronization.

27. The arrangement as claimed in claim 19;
wherein at least one partially transparent mirror is arranged in front of each of the objectives of the main camera and all satellite cameras.

28. The arrangement as claimed in claim 19;
wherein the center points of the objectives of the main camera and at least two satellite cameras form an isosceles triangle.

* * * * *